United States Patent
Lee

(10) Patent No.: US 11,858,380 B2
(45) Date of Patent: Jan. 2, 2024

(54) FOLDING CONTROL APPARATUS AND METHOD FOR VEHICLE SEATS

(71) Applicant: HYUNDAI TRANSYS INC., Seosan-si (KR)

(72) Inventor: Jin Woo Lee, Hwaseong-si (KR)

(73) Assignee: HYUNDAI TRANSYS INC., Seosan-si (KR)

( * ) Notice: Subject to any disclaimer, the term of this patent is extended or adjusted under 35 U.S.C. 154(b) by 604 days.

(21) Appl. No.: 17/096,654

(22) Filed: Nov. 12, 2020

(65) Prior Publication Data

US 2021/0155120 A1    May 27, 2021

(30) Foreign Application Priority Data

Nov. 21, 2019  (KR) .................. 10-2019-0150417

(51) Int. Cl.
*B60N 2/02* (2006.01)
*B60N 2/22* (2006.01)
*B60N 2/00* (2006.01)

(52) U.S. Cl.
CPC .......... *B60N 2/02246* (2023.08); *B60N 2/22* (2013.01); *B60N 2/002* (2013.01); *B60N 2/0244* (2013.01); *B60N 2/0268* (2023.08); *B60N 2/02253* (2023.08)

(58) Field of Classification Search
CPC ............... B60N 2/0232; B60N 2/0244; B60N 2/02246; B60N 2/22; B60N 2/002
See application file for complete search history.

(56) References Cited

U.S. PATENT DOCUMENTS

| | | | | |
|---|---|---|---|---|
| 8,467,940 B2* | 6/2013 | Hozumi | ............... | B60N 2/0244 701/49 |
| 9,018,869 B2* | 4/2015 | Yuasa | ..................... | B60N 2/856 318/260 |
| 9,187,020 B2* | 11/2015 | Meyer | ....................... | B60N 2/66 |
| 2002/0024305 A1 | 2/2002 | Itoh et al. | | |
| 2017/0158089 A1* | 6/2017 | Lee | ....................... | B60N 2/0244 |
| 2019/0047442 A1* | 2/2019 | Enderich | .................. | B60N 2/36 |
| 2020/0017000 A1* | 1/2020 | Lee | ........................... | B60N 2/22 |
| 2023/0135176 A1* | 5/2023 | Yang | ..................... | B60N 2/0232 701/36 |

FOREIGN PATENT DOCUMENTS

| | | |
|---|---|---|
| JP | 7144563 A | 6/1995 |
| JP | 2017210204 A | 11/2017 |
| KR | 1020130112372 A | 10/2013 |
| KR | 101540917 B1 | 7/2015 |
| KR | 1020150106590 A | 9/2015 |

OTHER PUBLICATIONS

XP055780217; Jan. 1, 2013; Retrieved from the Internet https://a-lab.ee/edu/system/files/Kristina.vassiljeva/courses/LAS0065/2018_Autumn/materials/AV18_L5; 12 pages.
Extended European Search Report dated Mar. 11, 2021; Appln. No. 20203829.5.

* cited by examiner

*Primary Examiner* — Syed A Islam

(57) ABSTRACT

The present disclosure relates to a folding control apparatus and method for vehicle seats capable of controlling folding or unfolding of a first vehicle seat and a second vehicle seat.

8 Claims, 3 Drawing Sheets

[FIG. 1]
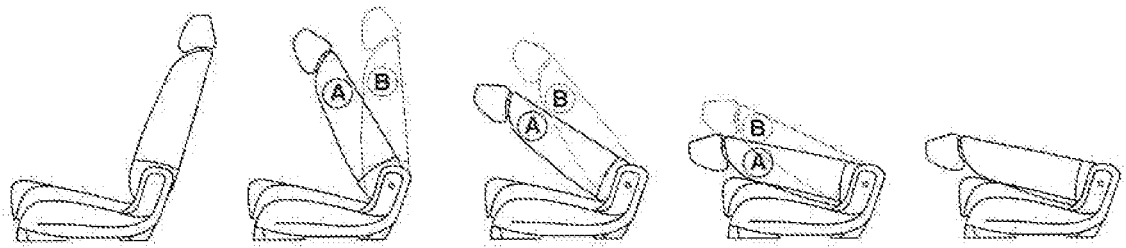
[FIG. 2]
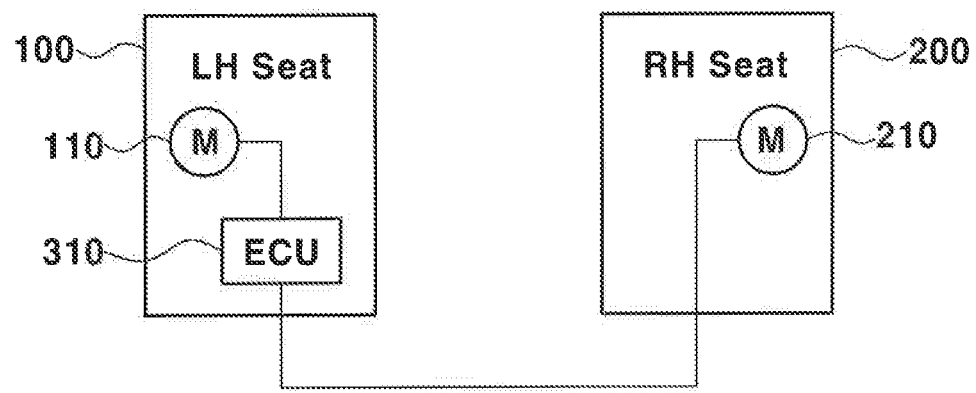
[FIG. 3]
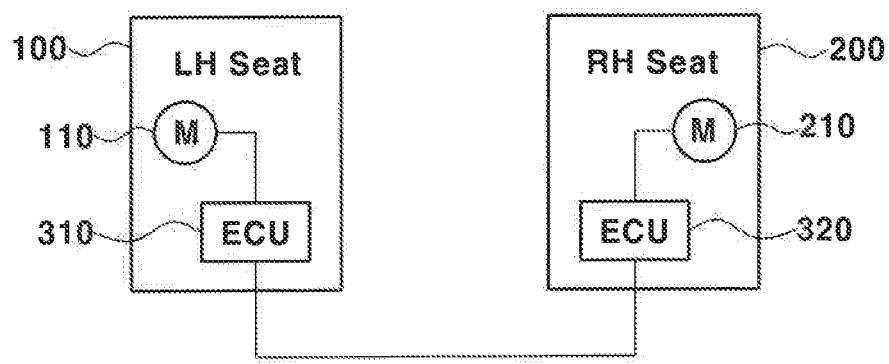

[FIG. 4]
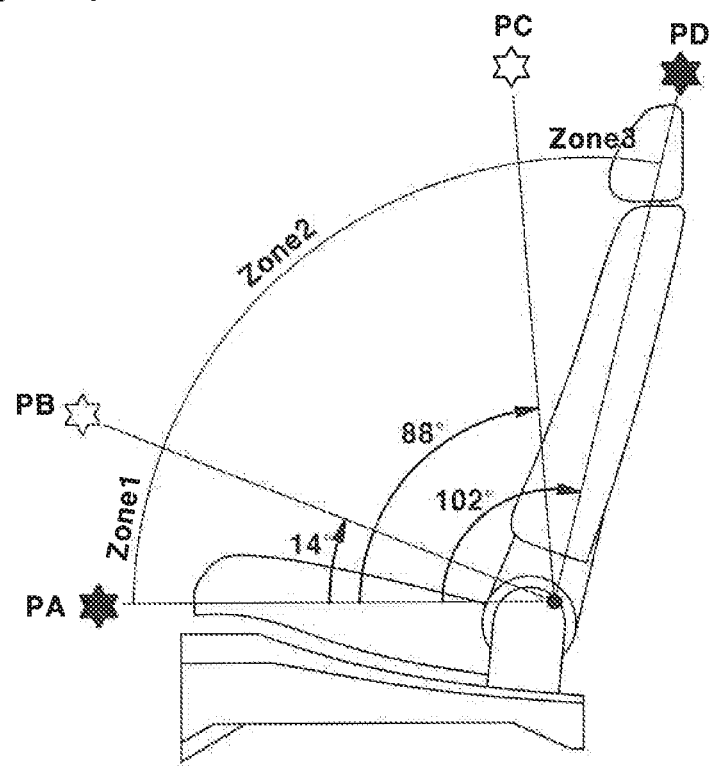

[FIG. 5]
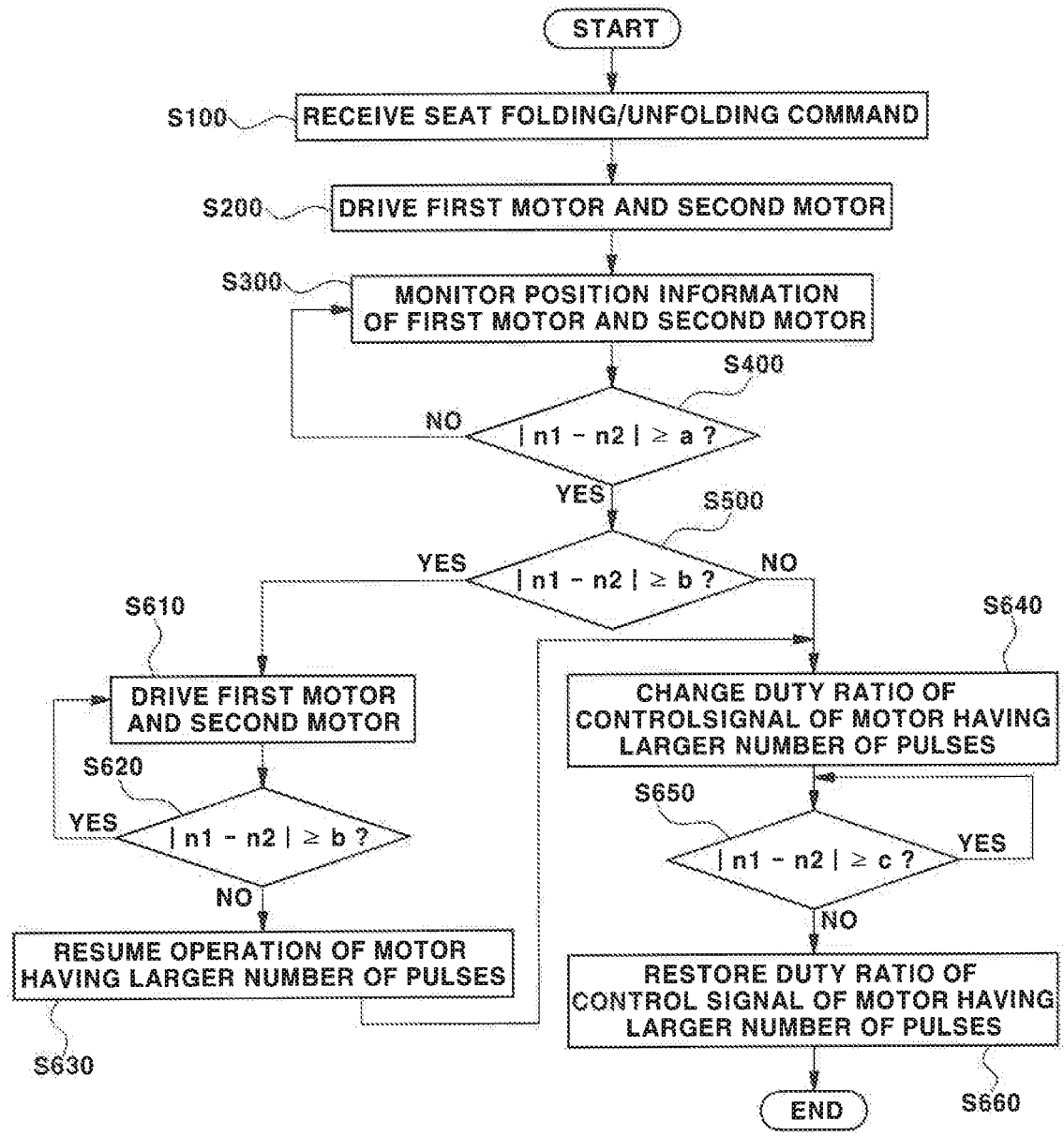

FOLDING CONTROL APPARATUS AND METHOD FOR VEHICLE SEATS

CROSS-REFERENCE TO RELATED APPLICATION

This application claims, under 35 U.S.C. § 119(a), the benefit of priority to Korean Patent Application No. 10-2019-0150417 filed on Nov. 21, 2019, the entire contents of which are incorporated herein by reference.

BACKGROUND

(a) Technical Field

The present disclosure relates to a folding control apparatus and method for vehicle seats, and more particularly to a folding control apparatus and method for vehicle seats capable of performing control such that two vehicle seats are folded or unfolded at the same speed upon receiving a folding or unfolding command for the two vehicle seats from a user,

(b) Background Art

In general, a vehicle seat is configured to allow a driver to sit thereon in a comfortable posture such that the driver feels no fatigue during long-distance driving. The vehicle seat generally includes a seat cushion, installed at the bottom of the interior of a vehicle so as to be slidable forwards and rearwards, and a seat back installed at the seat cushion so as to be tiltable a predetermined angle relative to the seat cushion.

The seat is provided with various convenience functions for passenger comfort. Thereamong, a folding function is a function of adjusting the inclination of the seat back to provide convenience to the driver.

In the seat having the folding function, the seat back is coupled to a seat cushion frame, and the seat back is coupled to a recliner arm. The recliner arm is tiltably coupled to the seat cushion frame via a recliner and a folding apparatus, whereby the seat back is folded forwards according to the operation of the folding apparatus.

Meanwhile, in order to perform the folding function of each seat, the folding apparatus includes a motor. Even in the case in which identical motors are mounted to the folding apparatuses of the seats and identical driving signals are applied to the motors, however, the operation speeds of the seats are different from each other due to variability of the motors and gears and a voltage drop based on a systematic wiring structure.

As a result, even in the case in which two vehicle seat folding switches are pushed by a user, the difference in speed between the seats occurs when the seats are folded, which may cause an emotional problem.

Meanwhile, the following prior art document discloses a seat back folding apparatus capable of generating elastic force in a direction in which a seat back is folded at the time of initial folding of the seat back and generating elastic force in a direction opposite the direction in which the seat back is folded after the seat back is tilted a predetermined angle using a single return spring, whereby it is possible to alleviate impact at the time of folding the seat back without a separate component and thus to reduce product cost, but does not disclose the technical gist of the present invention.

PRIOR ART DOCUMENT

Patent Document (Patent Document 1) Korean Registered Patent Publication No. 10-1586947

The above information disclosed in this Background section is provided only for enhancement of understanding of the background of the invention and therefore it may contain information that does not form the prior art that is already known in this country to a person of ordinary skill in the art.

SUMMARY OF THE DISCLOSURE

The present invention has been made in an effort to solve the above-described problems associated with the prior art.

It is an object of the present invention to provide a folding control apparatus and method for vehicle seats capable of performing control such that folding completion times of two or more seats are equal to each other when the seats are folded irrespective of a voltage drop due to the seats or a chassis or manufacturing variability of motors and gears.

The objects of the present invention are not limited to those described above. The objects of the present invention will be clearly understood from the following description of embodiments and could be implemented by means defined in the claims and a combination thereof.

In order to accomplish the above object, a folding control apparatus and method for vehicle seats according to the present invention includes the following constructions.

In one aspect, the present invention provides a folding control apparatus for vehicle seats configured to control folding or unfolding of a first vehicle seat and a second vehicle seat, the folding control apparatus including a first motor configured to generate driving force necessary to fold the first vehicle seat, a second motor configured to generate driving force necessary to fold the second vehicle seat, a first sensor configured to detect at least one of the rotational speed and the rotation amount of the first motor, a second sensor configured to detect at least one of the rotational speed and the rotation amount of the second motor, and at least one control module configured to control at least one of the first motor and the second motor based on detection results of the first sensor and the second sensor, wherein the control module controls at least one of the first motor and the second motor through duty ratio control.

In an example, the control module may include a first controller configured to control the first motor based on the detection result of the first sensor and a second controller configured to control the second motor based on the detection result of the second sensor.

In an example, when the control module receives a folding or unfolding command for each of the first vehicle seat and the second vehicle seat based on user manipulation, the control module may apply driving signals having the same duty ratio to the first motor and the second motor, In an example, the control module may compare the number of first pulses output from the first sensor for a predetermined time and the number of second pulses output from the second sensor for the predetermined time with each other, and upon determining that the difference between the number of first pulses and the number of second pulses is equal to or greater than a predetermined value a, may reduce the duty ratio of a driving signal applied to a motor having a larger number of pulses.

In an example, in the case in which the difference between the number of first pulses and the number of second pulses is reduced to less than a predetermined value c as the result of reduction of the duty ratio, the control module may apply the driving signals having the same duty ratio to the first motor and the second motor, the predetermined value c being less than the predetermined value a.

In an example, the control module may compare the number of first pulses output from the first sensor for a predetermined time and the number of second pulses output from the second sensor for the predetermined time with each other, and upon determining that the difference between the number of first pulses and the number of second pulses is equal to or greater than a predetermined value b, may stop application of a driving signal to a motor having a larger number of pulses.

In an example, in the case in which the difference between the number of first pulses and the number of second pulses is reduced to less than a predetermined value a as the result of stopping application of the driving signal to the motor having the larger number of pulses, the control module may reduce the duty ratio of the driving signal applied to the motor having the larger number of pulses, the predetermined value a being less than the predetermined value b.

In another aspect, the present invention provides a folding control method for vehicle seats using a folding control apparatus configured to control folding or unfolding of a first vehicle seat and a second vehicle seat, the folding control apparatus including a first motor configured to generate driving force necessary to fold the first vehicle seat, a second motor configured to generate driving force necessary to fold the second vehicle seat, a first Hall sensor configured to detect at least one of the rotational speed and the rotation amount of the first motor, a second Hall sensor configured to detect at least one of the rotational speed and the rotation amount of the second motor, and at least one control module configured to control at least one of the first motor and the second motor based on detection results of the first Hall sensor and the second Hall sensor, wherein the folding control method includes receiving a folding or unfolding command for each of the first vehicle seat and the second vehicle seat from a user, the control module applying driving signals having the same duty ratio to the first motor and the second motor, the first Hall sensor and the second Hall sensor acquiring position information of the first motor and the second motor to acquire a first pulse and a second pulse, respectively, the control module comparing the number of first pulses and the number of second pulses for a predetermined number with each other, and the control module controlling at least one of the first motor and the second motor based on the difference between the number of first pulses and the number of second pulses.

The step of comparing the number of first pulses and the number of second pulses with each other may include determining whether the difference between the number of first pulses and the number of second pulses is equal to or greater than a predetermined value a (a primary comparison step) and determining whether the difference between the number of first pulses and the number of second pulses is equal to or greater than a predetermined value b (a secondary comparison step), the predetermined value b being greater than the predetermined value a.

In the case in which the difference between the number of first pulses and the number of second pulses is equal to or greater than the predetermined value a in the primary comparison step and the difference between the number of first pulses and the number of second pulses is less than the predetermined value b in the secondary comparison step, the step of the control module controlling at least one of the first motor and the second motor based on the difference between the number of first pulses and the number of second pulses may include the control module reducing the duty ratio of a driving signal applied to a motor having a larger number of pulses, which is one of the first pulses and the second pulses, the control module determining whether the difference between the number of first pulses and the number of second pulses for a predetermined time is equal to or greater than a predetermined value c (a tertiary comparison step), and the control module restoring the reduced duty ratio of the driving signal to an original value upon determining that the difference between the number of first pulses and the number of second pulses for a predetermined time is less than the predetermined value c.

In the case in which the difference between the number of first pulses and the number of second pulses is equal to or greater than the predetermined value a in the primary comparison step and the difference between the number of first pulses and the number of second pulses is equal to or greater than the predetermined value b in the secondary comparison step, the step of the control module controlling at least one of the first motor and the second motor based on the difference between the number of first pulses and the number of second pulses may include the control module stopping application of a driving signal to a motor having a larger number of pulses, which is one of the first pulses and the second pulses, the control module determining whether the difference between the number of first pulses and the number of second pulses for a predetermined time is equal to or greater than the predetermined value b, and the control module applying a driving signal to the motor, to which application of the driving signal was stopped, again upon determining that the difference between the number of first pulses and the number of second pulses is less than b.

Other aspects and preferred embodiments of the invention are discussed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein:

FIG. 1 is a conceptual view illustrating problems of a conventional folding control apparatus for vehicle seats;

FIGS. 2 and 3 are block diagrams simply showing various configuration examples of a folding control apparatus for vehicle seats according to an embodiment of the present invention;

FIG. 4 is a view illustrating various folding zones in the folding control apparatus for vehicle seats according to the embodiment of the present invention; and FIG. 5 is a time-series flowchart showing a folding control method for vehicle seats according to an embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes, will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention, examples of which are illustrated in the accompanying drawings and described below. However, the present invention may be embodied in many different forms and should not be construed as limited to the embodiments set forth herein. Rather, these embodiments are provided so that the present invention will be thorough and complete, and will fully convey the scope of the present invention to those skilled in the art. The embodiments are merely given to make the disclosure of the present invention perfect to those skilled in the art.

The term "unit" or "module" used in this specification signifies one unit that processes at least one function or operation, and may be realized by hardware, software, or a combination thereof.

In addition, the terms "first" and "second" are used in this specification only to distinguish between the same elements, and the elements are not limited as to the sequence therebetween in the following description.

Hereinafter, conventional folding control for vehicle seats will be described with reference to FIG. 1.

In conventional folding control for vehicle seats, as shown in FIG. 1, seat A and seat B located at the same position are folded when a folding request is input to seat A and seat B by switching manipulation at the same time.

However, folding speeds of both seats are different from each other due to a voltage drop due to the seats or a chassis and tolerance of motors and gears, whereby folding completion times of both seats are different from each other even in the case in which the folding switch is operated with respect to both seats at the same time.

In order to solve the above problems, the present invention is configured to control the folding speeds of seat A and seat B so at to be equal to each other such that folding completion times of both seats are equal to each other when a folding request is input to both seats by switching manipulation at the same time. Hereinafter, a folding control apparatus for vehicle seats according to an embodiment of the present invention will be described with reference to FIGS. 2 to 4.

The folding control apparatus for vehicle seats according to the embodiment of the present invention, which is a folding control apparatus for vehicle seats configured to control folding or unfolding of a first vehicle seat 100 and a second vehicle seat 200, includes a first motor 110, a second motor 210, a first sensor, a second sensor, and a control module 300.

The first motor 110 performs a function of generating driving force necessary to fold the first vehicle seat 100, and the second motor 210 performs a function of generating driving force necessary to fold the second vehicle seat 200.

The first sensor performs a function of detecting the rotational speed and rotation amount of the first motor 110, and the second sensor performs a function of detecting the rotational speed and rotation amount of the second motor 210. Each of the first sensor and the second sensor is preferably a Hall sensor.

The control module 300 controls at least one of the first motor 110 and the second motor 210 based on the detection results of the first sensor and the second sensor. The control module 300 controls the driving speed of each of the first motor 110 and the second motor 210 through control of the duty ratio of a driving signal applied to at least one of the first motor 110 and the second motor 210.

Meanwhile, as shown in FIG. 2, the control module 300 may include only a single controller. The single controller may individually control the first motor 110 and the second motor 210.

That is, the single controller may calculate the number of pulses received from each of the first sensor and the second sensor to determine the position of each of the first motor 110 and the second motor 210, and may apply a driving signal to each of the first motor 110 and the second motor 210 based thereon.

Alternatively, as shown in FIG. 3, the control module 300 may include a first controller 310 and a second controller 320 configured to control the first motor 110 and the second motor 210, respectively. In this case, it is necessary for each of the first controller 310 and the second controller 320 to know a detection value of the sensor disposed at the other seat, and therefore the first controller 310 and the second controller 320 must communicate with each other.

Meanwhile, when the control module 300 receives a folding or unfolding command for each of the first vehicle seat 100 and the second vehicle seat 200 based on user manipulation, the control module 300 applies driving signals having the same duty ratio to the first motor 110 and the second motor 210.

Subsequently, the first sensor and the second sensor continuously monitor position information of the first motor 110 and the second motor 210, respectively, and the control module 300 compares the number of first pulses output from the first sensor for a predetermined time and the number of second pulses output from the second sensor for the predetermined time with each other.

Upon determining that the difference between the number of first pulses and the number of second pulses is equal to or greater than a predetermined value a, the control module 300 reduces the duty ratio of a driving signal applied to a motor having a larger number of pulses.

For example, when, in the state in which the control module 300 initially applies a driving signal having a duty ratio of 100% to each of the first motor 110 and the second motor 210, the driving speed of the first motor 110 becomes higher than the driving speed of the second motor 210 and thus the first vehicle seat 100 is folded earlier than the second vehicle seat 200, the control module 300 applies a driving signal having a duty ratio less than 100% (e.g. 90%, 80%, or 70%) to the first motor 110.

In this case, the rotational speed of the first motor 11 is reduced, whereby the folding position of the second vehicle seat 200 may approximate to the folding position of the first vehicle seat 100.

Meanwhile, the first sensor and the second sensor continuously monitor the rotational states of the first motor 110 and the second motor 120, respectively, even after the control module 300 reduces the duty ratio of the driving signal applied to the first motor 110. When the folding angles of the first vehicle seat 100 and the second vehicle seat 200 approximate to each other in the state in which the rotational speed of the first motor 110 is reduced, the control module 300 restores the duty ratio of the driving signal applied to the first motor, which has been reduced, to 100%.

As an example, in the case in which the control module 300 stops application of a driving signal to a motor having a larger number of pulses, whereby the difference between the number of first pulses and the number of second pulses is reduced to a predetermined value c, the control module

300 may apply driving signals having the same duty ratio to the first motor 110 and the second motor 120. c may be less than a. For example, c may be three pulses.

Meanwhile, in the case in which a is too large, a gap between the first vehicle seat 100 and the second vehicle seat 200 is great, and in the case in which a is too small, the duty ratio of a driving signal applied to each motor is too frequently changed, whereby the operation of the vehicle seats is unnatural. Consequently, it is preferable to appropriately set a.

Although the folding control of the vehicle seats was described above, unfolding control may be performed in the same manner.

Furthermore, in the case in which the duty ratio applied to each motor is reduced, the motor may stop or EMC noise may be generated. Consequently, it is preferable that the duty ratio be controlled only in a specific zone at the time of folding of each vehicle seat.

For example, in order to solve the above problem, the duty ratio is controlled only in a zone between PC and PD of FIG. 4 at the time of folding of each vehicle seat, and the duty ratio is controlled only in a zone between PA and PB of FIG. 4 at the time of unfolding of each vehicle seat.

Meanwhile, in the case in which the distance between the two vehicle seats is great, it may be difficult to reduce the distance between the two vehicle seats by simply controlling the speed of each motor through duty ratio change.

That is, in the case in which the difference between the number of first pulses and the number of second pulses is equal to or greater than b, which is a great difference difficult to overcome only through duty ratio control, as the result of comparison between the number of first pulses output from the first sensor for a predetermined time and the number of second pulses output from the second sensor for the predetermined time, the control module 300 stops application of a driving signal to a motor having a larger number of pulses. Here, c may be greater than a.

That is, in the case in which the difference between the number of first pulses and the number of second pulses is less than b after folding of a vehicle seat that is folded first is stopped, it is preferable to reduce the distance between both vehicle seats through duty ratio control, As an example, in the case in which the difference between the number of first pulses and the number of second pulses is reduced to less than the predetermined value a as the result of stopping application of a driving signal to a motor having a larger number of pulses, the control module 300 may reduce the duty ratio of the driving signal applied to the motor having the larger number of pulses. Also, in the case in which the difference between the number of first pulses and the number of second pulses is reduced to less than the predetermined value c as the result of reduction of the duty ratio, the control module 300 may apply driving signals having the same duty ratio to the first motor 110 and the second motor 120.

Hereinafter, a folding control method for vehicle seats according to an embodiment of the present invention will be described with reference to FIG. 5. A duplicate description of parts corresponding to the folding control apparatus for vehicle seats according to the embodiment of the present invention described above will be omitted.

In the folding control method for vehicle seats according to the embodiment of the present invention, which is a folding control method for vehicle seats using a folding control apparatus configured to control folding or unfolding of a first vehicle seat 100 and a second vehicle seat 200, a step (S100) of receiving a folding or unfolding command for each of the first vehicle seat 100 and the second vehicle seat 200 from a user is performed, as shown in FIG. 5.

Subsequently, a step (S200) of a control module 300 applying driving signals having the same duty ratio to a first motor 110 and a second motor 210 and a step (s300) of a first Hall sensor and a second Hall sensor acquiring position information of the first motor 110 and the second motor 210 to acquire a first pulse and a second pulse, respectively, are sequentially performed.

Subsequently, a step of the control module 300 comparing the number of first pulses and the number of second pulses for a predetermined time with each other is performed. The step of comparison between the number of first pulses and the number of second pulses may be divided into a primary comparison step (S400) of determining whether the difference between the number of first pulses and the number of second pulses is equal to or greater than a predetermined value a and a secondary comparison step (S500) of determining whether the difference between the number of first pulses and the number of second pulses is equal to or greater than a predetermined value b. Here, b may be greater than a.

A step of the control module 300 controlling at least one of a first motor 110 and a second motor 210 based on the comparison results of the primary comparison step (S400) and the secondary comparison step (S500), which are sequentially performed, is performed.

That is, in the case in which the difference between the number of first pulses and the number of second pulses is equal to or greater than a in the primary comparison step (S400) and the difference between the number of first pulses and the number of second pulses is less than b in the secondary comparison step (S500), it is possible to reduce the distance between both vehicle seats only by changing the duty ratio of a driving signal applied to each motor.

In this case, therefore, a step (S640) of the control module 300 reducing the duty ratio of a driving signal applied to a motor having a larger number of pulses, which is one of the first pulses and the second pulses, is performed.

Subsequently, the first Hall sensor and the second Hall sensor continuously detect position information of the first motor 110 and the second motor 210, respectively, and the control module 300 continuously compares the number of first pulses and the number of second pulses with each other.

That is, a tertiary comparison step (S650) of the control module 300 determining whether the difference between the number of first pulses and the number of second pulses for a predetermined time is equal to or greater than a predetermined value c is performed. Here, it is preferable that c be set to be equal to or less than b.

Subsequently, in the case in which the difference between the number of first pulses and the number of second pulses for a predetermined time is less than c, a step (S660) of the control module restoring the reduced duty ratio of the driving signal to the original value is performed.

Meanwhile, in the case in which the difference between the number of first pulses and the number of second pulses is equal to or greater than a in the primary comparison step (S400) and the difference between the number of first pulses and the number of second pulses is equal to or greater than b in the secondary comparison step (S500), it is not possible to reduce the distance between both vehicle seats only by changing the duty ratio of the driving signal applied to each motor.

In this case, therefore, a step (S610) of the control module 300 stopping application of a driving signal to a motor having a larger number of pulses, which is one of the first pulses and the second pulses, is performed.

Subsequently, the first Hall sensor and the second Hall sensor continuously detect position information of the first motor 110 and the second motor 210, respectively, and the control module 300 continuously compares the number of first pulses and the number of second pulses with each other That is, a step (S620) of the control module 300 determining again whether the difference between the number of first pulses and the number of second pulses for a predetermined time is equal to or greater than b is performed. At this time, when the difference between the number of first pulses and the number of second pulses is less than b, a step (S630) of the control module 300 applying a driving signal to the motor, to which application of the driving signal was stopped, again is performed, and then the step (S640) of the control module 300 reducing the duty ratio of a driving signal applied to a motor having a larger number of pulses, which is one of the first pulses and the second pulses, is performed.

As is apparent from the foregoing, the present invention may have the following effect from the construction, combination, and use of the embodiments described above.

In a folding control apparatus and method for vehicle seats according to embodiments of the present invention, the rotational states of two motors disposed at two vehicle seats are detected in real time, and driving signals applied to the motors are adjusted in real time such that the folding completion times of the two vehicle seats are the same when there is a difference in the rotational states between the two motors, whereby it is possible to improve emotional quality and thus to increase customer satisfaction.

The above detailed description illustrates the present invention. In addition, the foregoing describes exemplary embodiments of the present invention. The present invention may be used in various different combinations, changes, and environments. That is, variations or modifications can be made within the conceptual scope of the present invention, equivalents to the disclosure of the present invention, and/or the scope of technology and knowledge in the art to which the present invention pertains. The embodiments describe the best mode for realizing the technical concept of the present invention, and variations required for the concrete application and use of the present invention are possible. Therefore, the above detailed description does not limit the present invention disclosed above. In addition, the appended claims should be interpreted to include other embodiments.

What is claimed is:

1. A folding control apparatus for vehicle seats configured to control folding or unfolding of a first vehicle seat and a second vehicle seat, the folding control apparatus comprising:
 a first motor configured to generate driving force necessary to fold the first vehicle seat;
 a second motor configured to generate driving force necessary to fold the second vehicle seat;
 a first sensor configured to detect at least one of a rotational speed and a rotation amount of the first motor;
 a second sensor configured to detect at least one of a rotational speed and a rotation amount of the second motor; and
 at least one control module configured to control at least one of the first motor and the second motor based on detection results of the first sensor and the second sensor, wherein the control module controls at least one of the first motor and the second motor through duty ratio control,
wherein the control module compares a number of first pulses output from the first sensor for a predetermined time and a number of second pulses output from the second sensor for the predetermined time with each other, and upon determining that a difference between the number of first pulses and the number of second pulses is equal to or greater than a predetermined value a, reduces the duty ratio of a driving signal applied to a motor having a larger number of pulses, and upon determining that a difference between the number of first pulses and the number of second pulses is equal to or greater than a predetermined value b, stops application of a driving signal to a motor having a larger number of pulses, wherein the predetermined value a is less than the predetermined value b.

2. The folding control apparatus according to claim 1, wherein the control module comprises:
 a first controller configured to control the first motor based on the detection result of the first sensor; and
 a second controller configured to control the second motor based on the detection result of the second sensor.

3. The folding control apparatus according to claim 1, wherein
 when the control module receives a folding or unfolding command for each of the first vehicle seat and the second vehicle seat based on user manipulation,
 the control module applies driving signals having an identical duty ratio to the first motor and the second motor.

4. The folding control apparatus according to claim 1, wherein, in a case in which the difference between the number of first pulses and the number of second pulses is reduced to less than a predetermined value c as a result of reduction of the duty ratio, the control module applies the driving signals having the identical duty ratio to the first motor and the second motor, the predetermined value c being less than the predetermined value a.

5. The folding control apparatus according to claim 1, wherein, in a case in which the difference between the number of first pulses and the number of second pulses is reduced from the predetermined value (b) to less than a predetermined value a as a result of stopping application of the driving signal to the motor having the larger number of pulses, the control module reduces the duty ratio of the driving signal applied to the motor having the larger number of pulses.

6. A folding control method for vehicle seats using a folding control apparatus configured to control folding or unfolding of a first vehicle seat and a second vehicle seat, the folding control apparatus comprising a first motor configured to generate driving force necessary to fold the first vehicle seat, a second motor configured to generate driving force necessary to fold the second vehicle seat, a first Hall sensor configured to detect at least one of a rotational speed and a rotation amount of the first motor, a second Hall sensor configured to detect at least one of a rotational speed and a rotation amount of the second motor, and at least one control module configured to control at least one of the first motor and the second motor based on detection results of the first Hall sensor and the second Hall sensor, wherein the folding control method comprises:
 receiving a folding or unfolding command for each of the first vehicle seat and the second vehicle seat from a user;

the control module applying driving signals having an identical duty ratio to the first motor and the second motor;

the first Hall sensor and the second Hall sensor acquiring position information of the first motor and the second motor to acquire a first pulse and a second pulse, respectively;

the control module comparing a number of first pulses and a number of second pulses for a predetermined number with each other; and the control module controlling at least one of the first motor and the second motor based on a difference between the number of first pulses and the number of second pulses, wherein the step of comparing the number of first pulses and the number of second pulses with each other comprises:

determining whether the difference between the number of first pulses and the number of second pulses is equal to or greater than a predetermined value a (a primary comparison step); and determining whether the difference between the number of first pulses and the number of second pulses is equal to or greater than a predetermined value b (a secondary comparison step), the predetermined value b being greater than the predetermined value a, wherein when the difference between the number of first pulses and the number of second pulses is equal to or greater than a predetermined value b, the control mode stops application of a driving signal to a motor having a larger number of pulses, which is one of the first pulses and the second pulses.

7. The folding control method according to claim 6, wherein in a case in which the difference between the number of first pulses and the number of second pulses is equal to or greater than the predetermined value a in the primary comparison step and the difference between the number of first pulses and the number of second pulses is less than the predetermined value b in the secondary comparison step, the step of the control module controlling at least one of the first motor and the second motor based on the difference between the number of first pulses and the number of second pulses comprises:

the control module reducing the duty ratio of a driving signal applied to a motor having a larger number of pulses, which is one of the first pulses and the second pulses;

the control module determining whether the difference between the number of first pulses and the number of second pulses for a predetermined time is equal to or greater than a predetermined value c (a tertiary comparison step); and the control module restoring the reduced duty ratio of the driving signal to an original value upon determining that the difference between the number of first pulses and the number of second pulses for a predetermined time is less than the predetermined value c.

8. The folding control method according to claim 6, wherein in a case in which the difference between the number of first pulses and the number of second pulses is equal to or greater than the predetermined value a in the primary comparison step and the difference between the number of first pulses and the number of second pulses is equal to or greater than the predetermined value b in the secondary comparison step, the step of the control module controlling at least one of the first motor and the second motor based on the difference between the number of first pulses and the number of second pulses comprises:

the control module stopping application of a driving signal to a motor having a larger number of pulses, which is one of the first pulses and the second pulses;

the control module determining whether the difference between the number of first pulses and the number of second pulses for a predetermined time is equal to or greater than the predetermined value b; and the control module applying a driving signal to the motor, to which application of the driving signal was stopped, again upon determining that the difference between the number of first pulses and the number of second pulses is less than b.

* * * * *